(12) United States Patent
Wang

(10) Patent No.: US 7,914,919 B2
(45) Date of Patent: Mar. 29, 2011

(54) BATTERY FASTENING ASSEMBLY

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 98 days.

(21) Appl. No.: 12/405,552

(22) Filed: Mar. 17, 2009

(65) Prior Publication Data
US 2010/0103594 A1 Apr. 29, 2010

(30) Foreign Application Priority Data

Oct. 24, 2008 (CN) .......................... 2008 1 0305171

(51) Int. Cl.
H05K 5/00 (2006.01)
H05K 7/00 (2006.01)
H01M 2/10 (2006.01)

(52) U.S. Cl. ............... 429/100; 361/679.01; 361/679.58

(58) Field of Classification Search ............. 361/679.01, 361/679.58; 429/100
See application file for complete search history.

(56) References Cited

U.S. PATENT DOCUMENTS

| 5,716,730 A * | 2/1998 | Deguchi .......................... 429/97 |
| 6,211,648 B1 * | 4/2001 | Chew ............................ 320/112 |
| 7,322,835 B2 * | 1/2008 | Lin et al. ......................... 439/96 |

FOREIGN PATENT DOCUMENTS

| CN | 2660806 Y | 12/2004 |
| CN | 2842523 Y | 11/2006 |

* cited by examiner

Primary Examiner — Lisa Lea-Edmonds
Assistant Examiner — Anthony M Haughton
(74) Attorney, Agent, or Firm — Clifford O. Chi

(57) ABSTRACT

A battery fastening assembly for fastening a battery to a housing includes a hook and a positioning portion formed on the battery, and a slot defined in the housing, and a positioning portion formed on the housing. The slot is configured to engage with the hook, and the positioning portion of the housing is configured to engage with the positioning portion on the battery. The hook is slidable in the slot so that the battery is slidable relative to the housing and to make the positioning portion of the battery engage with or disengage from the positioning portion of the housing.

18 Claims, 5 Drawing Sheets

BATTERY FASTENING ASSEMBLY

BACKGROUND

1. Technical Field

The present disclosure generally relates to battery fastening assemblies and, particularly, to a battery fastening assembly for fastening a battery to an electronic device.

2. Description of the Related Art

Many portable electronic devices, such as notebook computers and portable disc players, usually have batteries to drive the electronic devices. The batteries are usually mounted to the electronic devices by battery fastening assemblies.

A typical battery fastening assembly includes a fastening member mounted on a housing of the electronic device, a plurality of latching portions formed on the battery, and an elastic member. The fastening member includes a plurality of engaging portions and an operating portion. The elastic member is disposed between the fastening member and the battery. The latching portions of the battery engage with the engaging portions of the fastening member to fasten the battery to the housing. When an external force is applied on the operating portion of the fastening member, the latching portions deform and disengage from the engaging portions such that the battery can be detached from the housing. However, the battery fastening assembly, especially the fastening member, is very complex.

Therefore, a new battery fastening assembly is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE EMBODIMENTS

Figure 1:
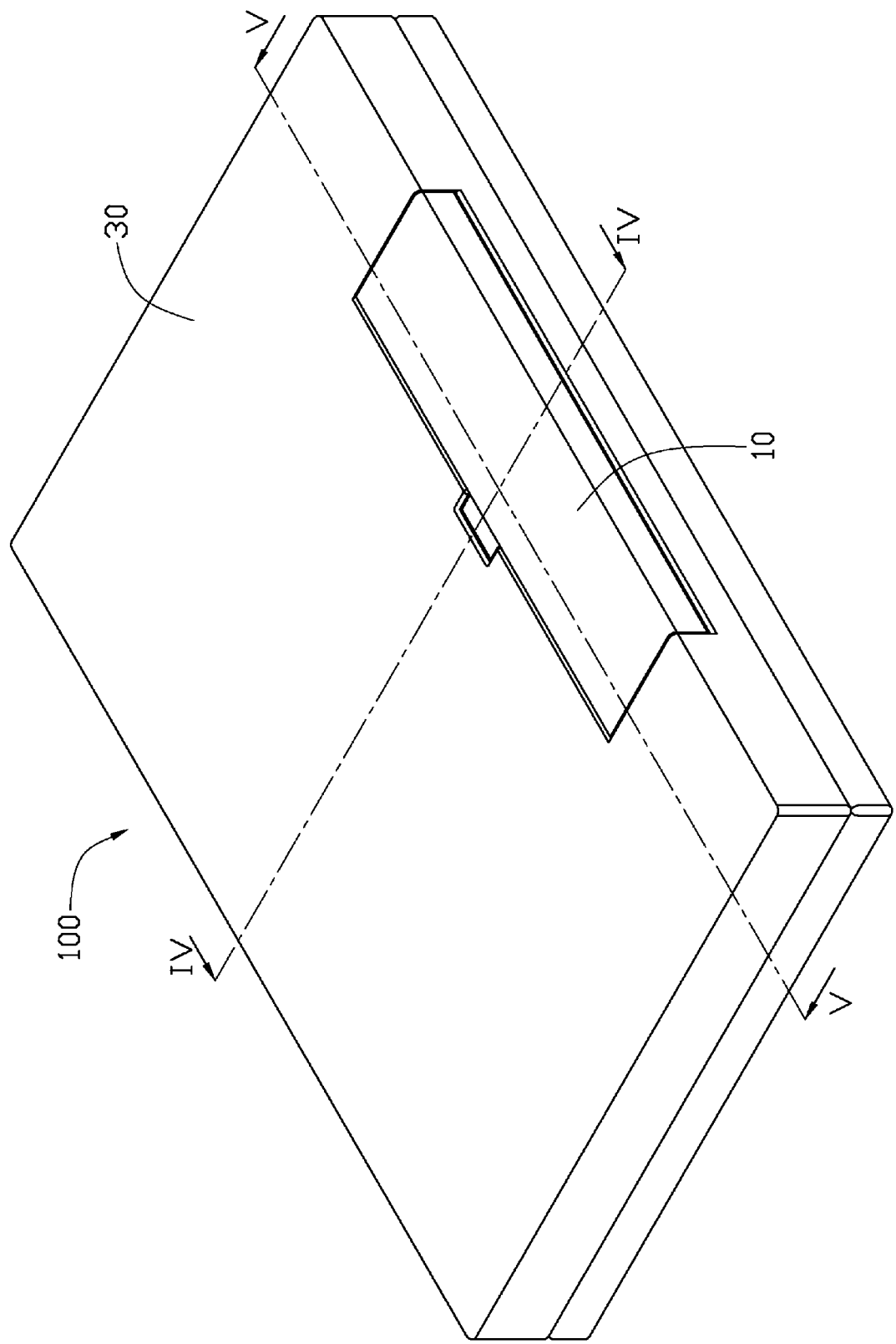
FIG. 1 is an assembled, isometric view of an electronic device employed with one embodiment of a battery fastening assembly.
Figure 2:
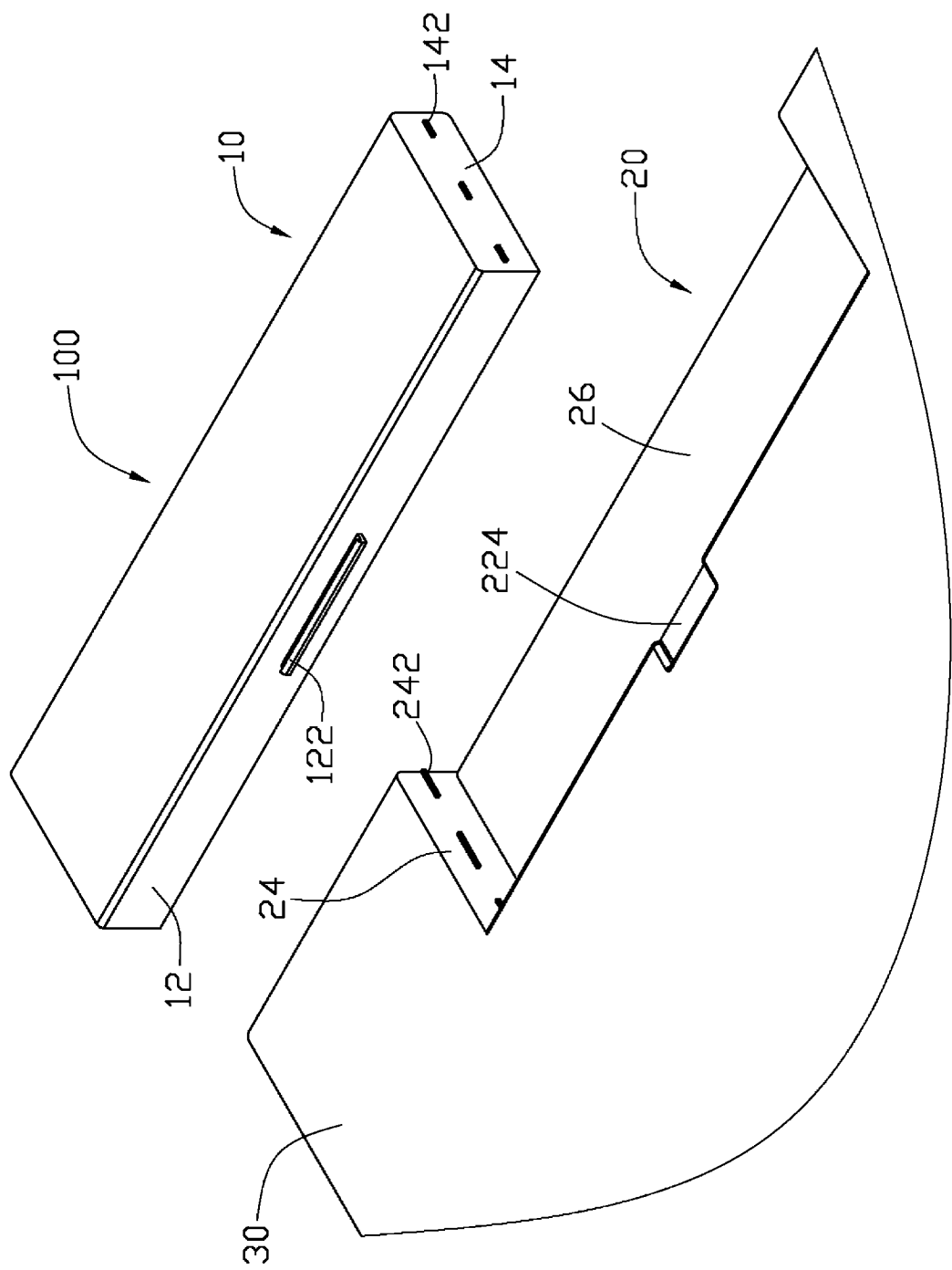
FIG. 2 is an exploded isometric view showing the battery fastening assembly apart from a housing of the electronic device of FIG. 1.
Figure 3:
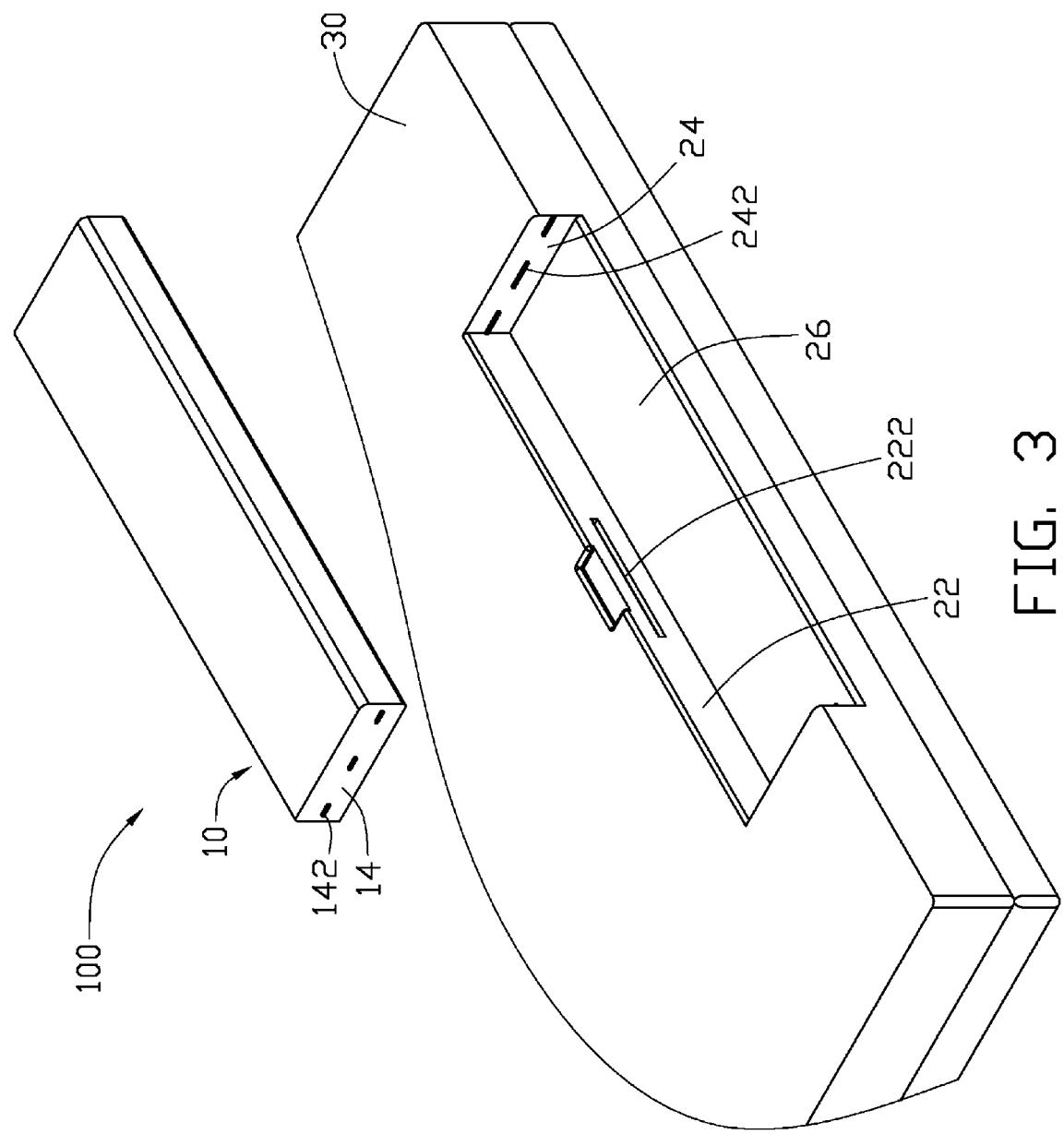
FIG. 3 is similar to FIG. 2, but viewed from another aspect.
Figure 4:
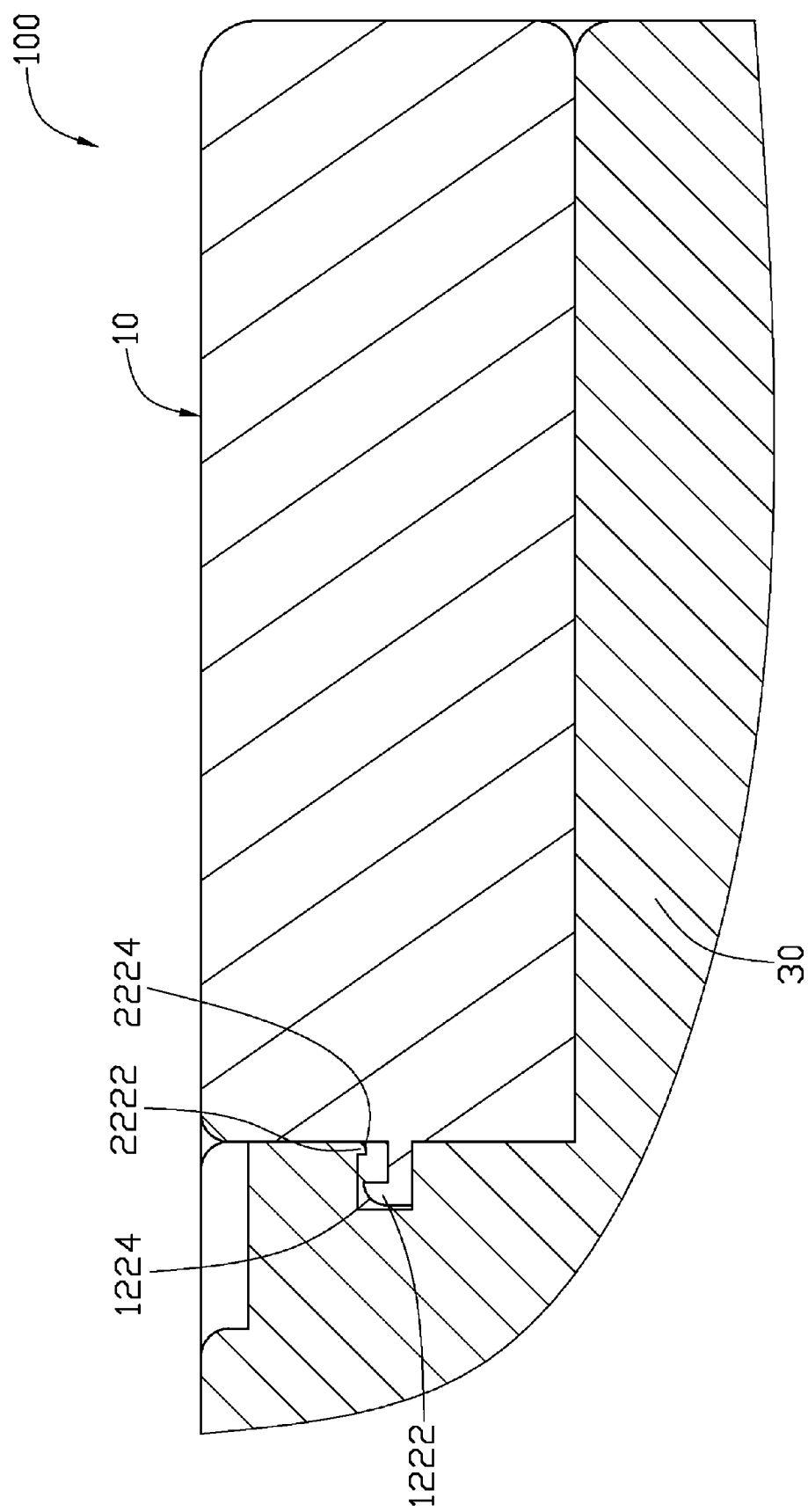
FIG. 4 is a cross-sectional view of the electronic device, taken along line IV-IV of FIG. 1.

Referring to FIGS. 1-4, one embodiment of a battery fastening assembly 100 includes a hook 122, a plurality of positioning protrusions 142, a receptacle 20, a slot 222 to engage with the hook 122, and a plurality of positioning projections 242 to engage with the positioning protrusions 142. In the illustrated embodiment, the hook 122 and the positioning protrusions 142 are formed on a battery 10, and the receptacle 20, the slot 222, and the positioning projections 242 are formed on a housing 30 of an electronic device. The battery 10 is positioned in the receptacle 20. The electronic device may be, for example, a notebook or a portable disc player.

Hereinafter, for convenience, the embodiments of the battery fastening assembly as used in a notebook is described and illustrated.

The battery 10 is substantially a cuboid in the illustrated embodiment. The battery 10 includes a first sidewall 12 and two opposite second sidewalls 14 adjacent to the first sidewall 12. The hook 122 is formed on the first sidewall 12 and the positioning protrusions 142 are formed on the second sidewalls 14. The hook 122 includes a deformable squeezing portion 1222. The squeezing portion 1222 has an arc-shaped engaging surface 1224 facing an outside of the hook 122. In the illustrated embodiment, three spaced positioning protrusions 142 are formed on each second sidewall 14. Each positioning protrusion 142 is an elongated protrusion.

The housing 30 includes a latching wall 22, two opposite positioning walls 24 adjacent to the latching wall 22, and a bottom wall 26 substantially perpendicular to the latching wall 22 and the positioning walls 24, thus defining the receptacle 20. The slot 222 is defined in the latching wall 22, and a plurality of positioning projections 242 are defined in each positioning wall 24. In the illustrated embodiment, the positioning projections 242 are three spaced elongated protrusions. A distance between every two adjacent positioning projections 242 is greater than a length of each positioning protrusion 142, thus allowing the positioning protrusions 142 to pass through gaps between the positioning projections 242. A latch 2222 is formed in the slot 222, and has an arch-shaped engaging surface 2224. When the hook 122 is engaged in the slot 222, a gap is defined between the squeezing portion 1222 of the hook 122 and the latch 2222, allowing the hook 122 to slide in the slot 222. A cutout 224 is defined in the latching wall 22. The cutout 224 is adjacent to and communicates with the receptacle 20. In use, a finger of a user can extend into the cutout 224, thus facilitating disassembling the battery 10 from the housing 30.

Figure 5:
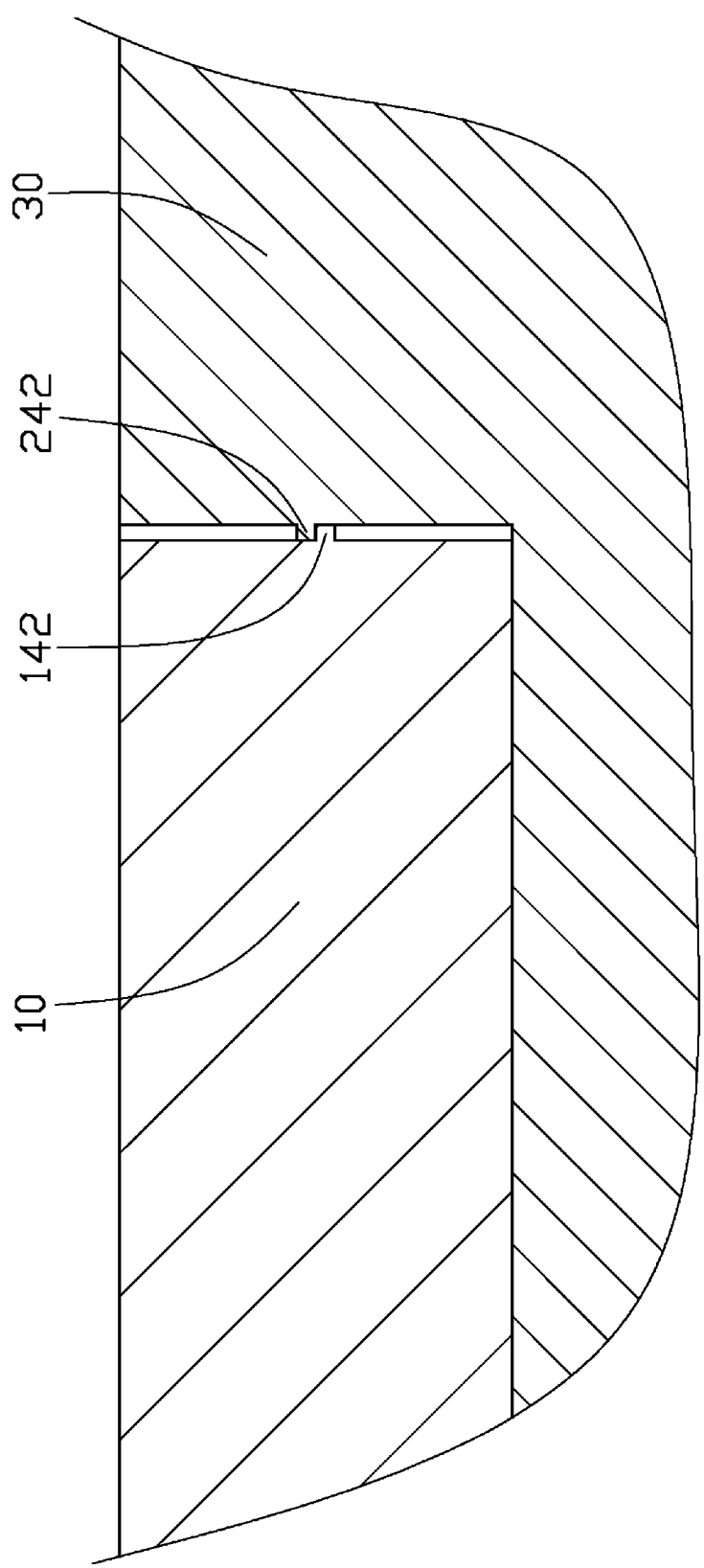
FIG. 5 is a cross-sectional view of the electronic device, taken along line V-V of FIG. 1.

Referring to FIGS. 1-5, to install the battery 10 in the housing 30, the battery 10 is positioned in the receptacle 20 of the housing 30, and the positioning protrusions 142 of the battery 10 are at positions corresponding to gaps between the positioning projections 242 of the housing 30. The battery 10 is pressed to make the positioning protrusions 142 pass through gaps between the positioning projections 242. Then the battery 10 is pushed to slide towards the latching wall 22 along a direction parallel to the positioning projections 242 until the hook 122 engages in the slot 222, thereby installing the battery 10 in the housing 30. In this sliding process, the engaging surface 1224 of the hook 122 initially resists the engaging surface 2224 of the latch 2222 in the slot 222, until a further sliding of the battery 10 forces the hook 122 to deform and pass through the latch 2222. The battery 10 may be firmly held in the receptacle 20 because of an interference fit between the positioning protrusions 142 and the positioning projections 242.

To remove the battery 10 from the housing 30, the battery 10 is pushed to slide in the receptacle 20 until the positioning protrusions 142 of the battery 10 are at positions corresponding to gaps between the positioning projections 242 of the housing 30. In the illustrated embodiment, the battery fastening assembly 100 is designed so that when the positioning protrusions 142 of the battery 10 are at positions corresponding to gaps between the positioning projections 242 of the housing 30, the hook 122 resists the latch 2222. The battery 10 is pulled away from the bottom wall 26, thus making the battery 10 rotate about the latch 2222. When the hook 122 rotates to an inclined position, the hook 122 deforms and can be disassembled from the slot 222, and the battery 10 can be removed from the housing 30.

The battery 10 can be firmly held in the housing 30 by the hook 122, the slot 222, the positioning protrusions 142 and the positioning projections 242. Thus, the battery fastening assembly 100 is very simple.

It can be understood that at least one of the latch 2222 and the hook 122 is elastic, thus deformable. In alternative embodiments, the positioning protrusions 142 may be formed on only one of the two second sidewalls 14, and the number of the positioning protrusions 142 and the positioning projections 242 may be only one. The positioning protrusions 142 and the positioning projections 242 may be replaced by other positioning portions such a positioning slot. The latch 2222 and the hook 122 may not be elastic, so that the latch 2222 and the hook 122 may be engaged to or disengaged from each other by aslant arranging the battery 10.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A battery fastening assembly for fastening a battery to a housing, the battery fastening assembly comprising:
    a hook and a positioning portion formed on the battery;
    a slot defined in the housing to engage with the hook, and a positioning portion formed on the housing to engage with the positioning portion on the battery; and
    a latch formed in the slot and having an arc-shaped engaging surface;
    wherein the hook is slidable in the slot so that the battery is slidable relative to the housing to make the positioning portion of the battery engage with or disengage from the positioning portion of the housing, the hook comprises a deformable squeezing portion having an arc-shaped engaging surface facing outside of the hook; when the hook is engaged in the slot, a gap is defined between the squeezing portion of the hook and the latch, allowing the hook to slide in the slot.

2. The battery fastening assembly of claim 1, wherein the positioning portion of the battery and the positioning portion of the housing form an interference fit with each other.

3. The battery fastening assembly of claim 1, wherein at least one of the latch and the hook is elastic.

4. The battery fastening assembly of claim 1, wherein the positioning portion of the battery and the positioning portion of the housing are elongated protrusions.

5. The battery fastening assembly of claim 1, wherein the battery comprises a first sidewall and two opposite second sidewalls adjacent and adjoining to the first sidewall; the hook is formed on the first sidewall and the positioning portion is formed on the second sidewalls.

6. The battery fastening assembly of claim 5, wherein the positioning portion of the battery comprises a plurality of positioning protrusions formed on each of the second sidewalls, and the positioning protrusions are spaced from each other.

7. The battery fastening assembly of claim 6, wherein the housing comprises a latching wall, two opposite positioning walls adjacent and adjoining to the latching wall, and a bottom wall substantially perpendicular to the latching wall and the positioning walls, thus defining a receptacle for receiving the battery.

8. The battery fastening assembly of claim 7, wherein the latching wall defines the slot, and each positioning wall defines the positioning portion.

9. The battery fastening assembly of claim 8, wherein the positioning portion of the housing comprises a plurality of positioning projections spaced from each other; a distance between every two adjacent positioning projections is larger than a length of each positioning protrusion, thus allowing the positioning protrusions to pass through gaps between the positioning projections.

10. The battery fastening assembly of claim 9, wherein a cutout is defined in the latching wall, the cutout is adjacent to and communicates with the receptacle.

11. A battery fastening assembly for fastening a battery to a housing, the battery fastening assembly comprising:
    a hook and a positioning portion formed on the battery;
    a slot defined in the housing and a positioning portion formed on the housing; and
    a latch formed in the slot and having an arc-shaped engaging surface;
    wherein when the battery is held to the housing, the hook is engaged in the slot and the positioning portion of the battery is engaged with the positioning portion of the housing; when detaching the battery from the housing, the battery is slid to make the positioning portion of the battery to slide to a side of the positioning portion of the housing and the hook to slide in the slot, so that the battery is capable of detaching from the housing, the hook comprises a deformable squeezing portion having an arc-shaped engaging surface facing outside of the hook; when the hook is engaged in the slot, a gap is defined between the squeezing portion of the hook and the latch, allowing the hook to slide in the slot.

12. The battery fastening assembly of claim 11, wherein the positioning portion of the battery and the positioning portion of the housing form an interference fit with each other.

13. The battery fastening assembly of claim 11, wherein at least one of the latch and the hook is elastic.

14. The battery fastening assembly of claim 11, wherein the positioning portion of the battery and the positioning portion of the housing are elongated protrusions.

15. The battery fastening assembly of claim 14, wherein the battery comprises a first sidewall and two opposite second sidewalls adjacent and adjoining to the first sidewall; the hook is formed on the first sidewall and the positioning portion is formed on the second sidewalls.

16. The battery fastening assembly of claim 15, wherein the positioning portion of the battery comprises a plurality of positioning protrusions formed on each of the second sidewalls, and the positioning protrusions are spaced from each other.

17. The battery fastening assembly of claim 16, wherein the housing comprises a latching wall, two opposite positioning walls adjacent and adjoining to the latching wall, and a bottom wall substantially perpendicular to the latching wall and the positioning walls, thus defining a receptacle for receiving the battery; the latching wall defines the slot, and each positioning wall defines the positioning portion.

18. The battery fastening assembly of claim 17, wherein the positioning portion of the housing comprises a plurality of positioning projections spaced from each other; a distance between every two adjacent positioning projections is larger than a length of each positioning protrusion, thus allowing the positioning protrusions to pass through gaps between the positioning projections.

* * * * *